OHMIC LOW RESISTANCE CONTACT TO GALLIUM ARSENIDE

Filed Oct. 28, 1968

ROOM TEMPERATURE I-V CHARACTERISTICS OF ALLOYED Au-Ge CONTACTS ON GaAs

LIQUID NITROGEN I-V CHARACTERISTICS OF ALLOYED Au-Ge CONTACTS ON GaAs

ARTHUR R. CLAWSON
HARRY H. WIEDER
INVENTORS

BY J. M. St. Amand
ATTORNEY

1

3,532,562

OHMIC LOW RESISTANCE CONTACT TO GALLIUM ARSENIDE

Arthur R. Clawson and Harry H. Wieder, Riverside, Calif., assignors to the United States of America as represented by the Secretary of the Navy Filed Oct. 28, 1968, Ser. No. 771,222
Int. Cl. H01l 7/46
U.S. Cl. 148—179 9 Claims

ABSTRACT OF THE DISCLOSURE

A method for producing low resistance ohmic contacts to intermetallic III–V semiconductor gallium arsenide and similar type semiconductors which comprises preparing a surface of a GaAs wafer by lightly etching, masking said GaAs surface and depositing a layer of metallic contact material onto the unmasked portion of said GaAs surface, removing said masking and depositing an inert oxide layer over said metallic contact material and said GaAs surface, heating said GaAs wafer to form an alloyed interface between said contact material and said GaAs wafer.

The invention herein described may be manufactured and used by or for the Government of the United States of America for governmental purposes without the payment of any royalties thereon or therefor.

The general purpose of this invention is to provide low resistance ohmic contacts to the intermetallic III–V semiconductor GaAs. These contacts must be amenable to complex geometrical contour shaping by photolithographic techniques. The contacts have a shallow penetration into the GaAs and are useful on bulk crystalline material and single crystal epitaxial films.

The problem of applying ohmic contacts to GaAs is a general one which appears in the diode and transistor technology of this material and which has particular significance to microwave devices. It is of particular importance to p-n devices, injection electroluminescent diodes and in the fabrication of Gunn effect devices. The prior art has shown that to make a good ohmic contact to GaAs, requires the alloying of the electrode with the GaAs. Contacts have been made by placing pellets of the contact material on the GaAs, or by evaporating the contact material onto the GaAs, followed by an alloying process. Variations of this such as hot dipping the GaAs into the molten contact material, or heating the GaAs as the material is vapor deposited have also been used. All the successful techniques require alloying to the GaAs.

Many different contact materials have been tried in the past, with various degrees of success. One material that has provided good results in Gunn device fabrication is the Au-Ge eutectic. The difficulty in alloying this material to GaAs is the breaking up of the contact layer into droplets when it is heated. This is a problem common to many of the contact materials that have been tried. Braslau et al., Solid State Electronics, 10, 381 (1967), attempted to solve the problem by adding Ni to the Au-Ge material, wherein a Ni layer was formed on the top surface of the contact during vacuum deposition of the material. The Ni layer does not dissolve at the alloying temperature and holds the Au-Ge from breaking up. However, connecting wires must be attached to the Ni layer which is subject to chemical deterioration by its exposure to the atmosphere. Furthermore, the Ni layer presents a high resistance for the device connected to a gold-contact strip-line.

Other objects and many of the attendant advantages of this invention will become readily appreciated as the

2 same becomes better understood by reference to the following detailed description when considered in connection with the accompanying drawings wherein:

The technique of this invention used to make ohmic contact to GaAs is different from and an improvement over techniques previously used. A contact material, Au-Ge eutectic, which gives excellent ohmic junctions with GaAs, is vacuum deposited onto a clean wafer of GaAs in a pattern determined by any convenient masking technique. To prevent the surface tension of the Au-Ge from destroying the continuity of the contact during the alloying heat cycle, an inert oxide layer is deposited on the surface of the Au-Ge. The GaAs is heated above the melting temperature of the Au-Ge eutectic during the alloying heat cycle, then cooled to form an alloy interface between the contact and semiconductor. The oxide constrains the molten Au-Ge eutectic layer to prevent its forming into droplets. After the alloying, the oxide layer is removed either by mechanical or chemical means. Electrical leads are then readily attached to the chemically inert, electrically conductive Au-Ge surface.

Samples of GaAs were etched in 5:1:1; $H_2O_2$–$H_2O$, for about 45 seconds to remove any damaged surface layer. The samples were rinsed in $H_2O$ and placed in ethanol until ready for use. Then the samples were masked with copper foil and placed in the vacuum chamber. 396 mg. Au and 49.7 mg. Ge were placed together in an alumina-covered tungsten wire crucible. The source-to-specimen distance was approximately 6 inches. The Au-Ge was evaporated in a vacuum of $2\times10^{-5}$ torr to provide contacts about 1 $\mu$m. thick. The source was then replaced with one of In and an layer of $In_2O_3$ was deposited in an oxygen atmosphere at a pressure of $8\times10^{-4}$ torr. The $In_2O_3$ layer was approximately 50 A. thick.

Figure 1:
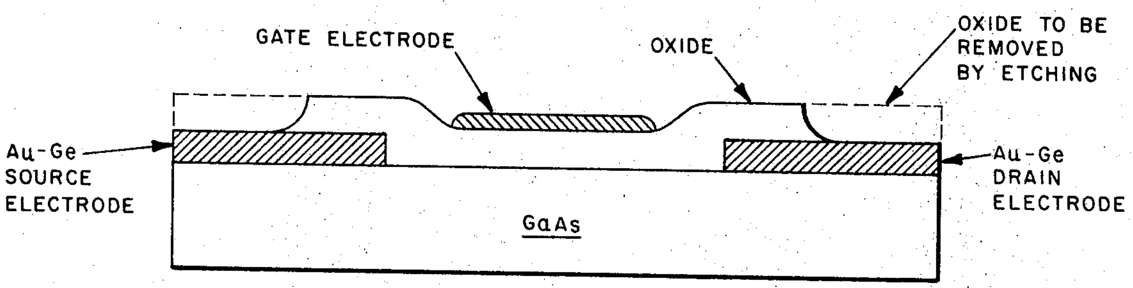
FIG. 1 shows in cross-section, a metal-oxide-semiconductor produced by the method of this invention where an oxide layer acts as both the dielectric and constraining film for alloying the contact electrodes.

The GaAs samples were then heated by an incandescent lamp heater to approximately 400° C. for approximately 2 minutes in a 1 $\mu$m. vacuum. The Au-Ge film remained contiguous while molten except for a few small regions where the oxide had been pierced. These regions were microscopic in size and they varied from specimen to specimen. On the other hand, in any portion of a film on which the oxide had been scratched while handling the film with tweezers the Au-Ge layer coagulated into droplets. Careful handling of the GaAs samples to prevent piercing of the inert oxide layer permits the Au-Ge film to remain contiguous. The oxide on the samples prepared as described above was removed chemically with a lactic acid-$HNO_3$, 10:1, etch. This etched the GaAs slightly, but did not affect the Au-Ge layer. An MOS transistor configuration utilizing the oxide layer both as the dielectric and as the constraining film for alloying the contact electrodes is shown in FIG. 1.

Figure 2:
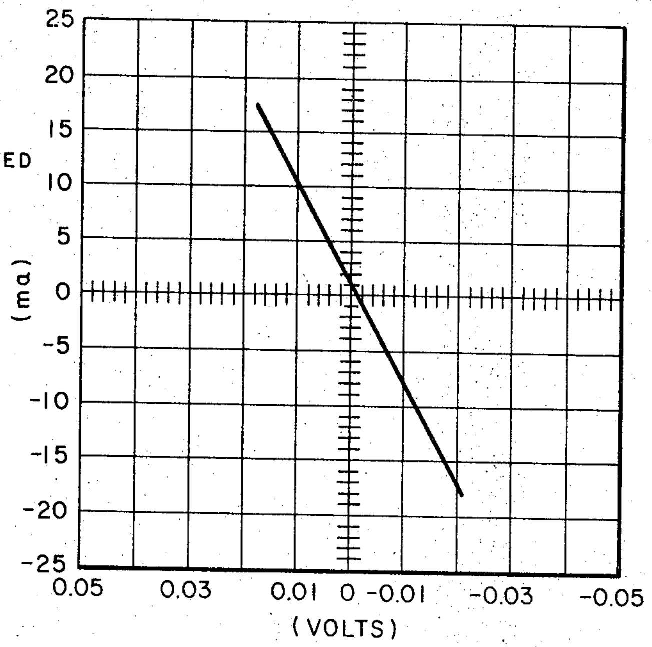
FIG. 2 shows room temperature I–V characteristics of alloyed Au-Ge contacts on GaAs.
Figure 3:
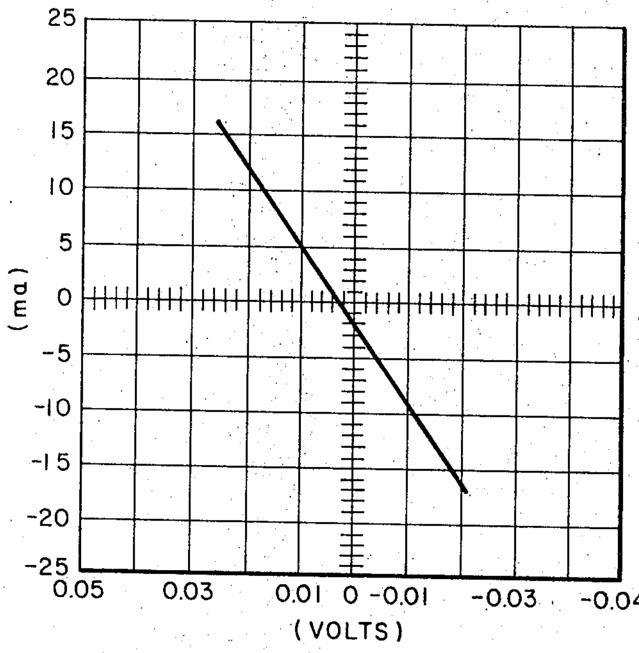
FIG. 3 shows liquid nitrogen I–V characteristics of alloyed Au-Ge contacts on GaAs.

Electrical leads were made with tinned copper wire and silver paste. The application of 20 volts of both polarities showed complete linearity of the I–V characteristic of the contact. The nature and character of the ohmic contacts at room temperature and liquid nitrogen is illustrated by the linearity of their I–V characteristics as shown in FIGS. 2 and 3 respectively.

The use of the chemically inert oxide layer on the Au-Ge film provides new and commercially reproducible technique without the disadvantages of prior methods. The oxide is extremely important in that it holds the Au-Ge film together, i.e. keeps it contiguous during the alloying process by counteracting the surface tension of the molten Au-Ge. The oxide does not participate in the alloying process, nor is there any interaction between the oxide and either the Au or the Ge as there is with an Ni layer. The alloying process is thus independent of the oxide. Consequently other eutectic alloys in addition to Au-Ge eutectic can be used with the technique described herein.

The oxide layer can be easily removed once the contact is alloyed with the GaAs. This allows electrical leads to be attached directly to the Au-Ge eutectic, rather than to an intermediate metal layer. The Au is impervious to chemical deterioration and thus contact stability over a long period of time is assured. Furthermore very low resistance contact over large or microscopic areas can be made in this manner.

The use of an oxide layer has a double advantage in the formation of MOS (metal-oxide-semiconductor) transistors as shown in FIG. 1. A single oxide layer provides both the dielectric region for the transistor and the constraining film for alloying the contacts to the semiconductor. By masking the dielectric region the oxide on the contacts can be selectively removed to accommodate leads.

Any oxide that does not react with the underlying contact metal, and that remains stable at the alloying temperature can be used, such as $Al_2O_3$, $In_2O_3$, or $SIO_2$. For practical purposes, the choice is limited to an oxide that can be easily removed, either chemically or mechanically.

Any contact material compatible with the oxide can be used, such as Sn, Bi, In, Pb, Zn, Cd, or any low melting temperature alloy. However, to be practical, this choice is limited to those materials that give good ohmic contact to GaAs, such as Au-Ge.

What is claimed is:

1. A method for making low resistance ohmic contacts to intermetallic GaAs semiconductor devices, on bulk crystalline material and single crystal expitaxial films, comprising (a) preparing a surface of a GaAs wafer by lightly etching said surface to remove any damaged surface layer, (b) masking said GaAs surface with a desired pattern and vacuum depositing a layer of low-melting temperature metallic contact material onto the unmasked portion of said GaAs surface, (c) removing said masking and depositing an inert oxide layer over said vacuum deposited metallic contact material and said GaAs surface, (d) heating said GaAs wafer in vacuum to a temperature to melt said contact material and then cooling to form an alloyed interface between said contact material and said GaAs wafer, (e) during said alloying heating cycle, said inert oxide layer constraining the molten contact material layer to prevent the surface tension thereof from forming the molten contact material into droplets and destroy its continuity, (f) said inert oxide layer being non-reactive with said contact material and capable of being easily removed by chemical or mechanical means without deleterious effect to said contact material and said contact material being compatible with said inert oxide, the alloying process being independent of said oxide.

2. A method as in claim 1 wherein said metallic contact material is Au-Ge eutectic.

3. A method as in claim 1 wherein said inert oxide layer is $In_2O_3$.

4. A method as in claim 1 wherein said metallic contact material layer is approximately 1 $\mu$m. thick and said inert oxide layer is approximately 50 angstroms thick.

5. A method as in claim 1 wherein $Al_2O_3$ is the inert oxide layer.

6. A method as in claim 1 wherein said inert oxide layer is $SiO_2$.

7. A method as in claim 1 wherein said contact material is selected from any one of Sn, Bi, Pb, Zn and Cd.

8. A method as in claim 1 wherein said oxide layer provides both the dielectric region for said semiconductor device and the constraining film for alloying the contact material to said semiconductor.

9. A method as in claim 1 wherein electrical leads are attached directly to said contact material by soldering.

References Cited

UNITED STATES PATENTS 3,386,867 6/1968 Staples ____________ 148—180

RICHARD O. DEAN, Primary Examiner

U.S. Cl. X.R.

148—180, 185